United States Patent [19]

Sato

[11] 3,759,464

[45] Sept. 18, 1973

[54] AUTOMATIC TAPE RUNNING REVERSING APPARATUS FOR USE IN A TAPE RECORDER

[75] Inventor: Manabu Sato, Yokohama, Japan

[73] Assignee: Victor Company of Japan, Ltd., Kanagawa-ken, Japan

[22] Filed: Aug. 23, 1971

[21] Appl. No.: 174,103

[30] Foreign Application Priority Data

Aug. 21, 1970 Japan .............................. 45/73283

[52] U.S. Cl. .............................................. 242/188

[51] Int. Cl...... B65h 59/39, G03b 1/04, G11b 1/52

[58] Field of Search .............................. 242/186–190

[56] References Cited

UNITED STATES PATENTS 2,941,737 6/1960 Jones ................................ 242/188

*Primary Examiner*—Leonard D. Christian

*Attorney*—Holman & Stern

[57] ABSTRACT

An automatic tape running reversing apparatus for use in a tape recorder comprises means for detecting running of a tape to its terminal end and a mechanism in which one pinch roller is spaced away from one capstan which has been rotated and rotation of one reel disk is stopped responsive to detecting operation of the detecting means, whereas another pinch roller is caused to make pressing contact with another capstan and another reel disk starts its rotation. This mechanism enables the tape to reverse its running direction automatically.

4 Claims, 8 Drawing Figures

AUTOMATIC TAPE RUNNING REVERSING APPARATUS FOR USE IN A TAPE RECORDER

BACKGROUND OF THE INVENTION

This invention relates to an automatic tape running reversing apparatus and, more particularly, to an apparatus for automatically reversing the running direction of a tape in a tape recorder.

In a case wherein a tape, such as a cassette tape, the ends of which are fixed to spools or reels is used in a tape recorder, accidents such as damage on the tape or the mechanism will take place if the tape running mode continues after the tape has finished its running in one direction. In order to prevent occurrence of such accidents, an apparatus in which completion of running of the tape to its terminal end is detected thereby to stop the running of the tape has been proposed and put to a practical use in connection with the tape recorder using this type of tape.

PRIOR ART

In this conventional apparatus, however, a continuous recording or reproduction to a full tape width capacity of the tape must be conducted by turning over the cassette when the running of the tape in one direction has been completed and stopped and depressing again a button for recording or reproduction mode so as to resume the recording or reproduction mode. Therefore, the continuous recording or reproduction to the full tape width capacity of the tape in the conventional apparatus inevitably required a troublesome operation.

OBJECTS AND SUMMARY OF THE INVENTION

It is therefore a general object of the invention to eliminate the above described disadvantage and to provide a novel and useful automatic tape running reversing apparatus for a tape recorder.

Another object of the invention is to provide an apparatus for automatically reversing the running direction of a tape used in a tape recorder when the running of the tape in one direction has been completed. According to this automatic tape running reversing apparatus, a continuous and respective recording or reproduction is possible because the tape running direction is automatically reversed when the running of the tape is completed.

A further object of the invention is to provide an automatic tape running reversing apparatus in which the tape running direction is automatically reversed when the running of the tape in one direction is finished in modes other than a reproduction mode, such as a tape fast forwarding mode, rewinding mode and a recording mode, and the mode is changed over to the reproduction mode.

A still further object of the invention is to provide an automatic tape reversing apparatus which is capable not only of automatically reversing the tape running direction but also of manually reversing the tape running direction at a desired time during the running of the tape.

Generally, the invention is directed to an automatic tape running reversing apparatus for use in a tape recorder including a rotational driving source, a pair of capstans for driving a magnetic tape which are provided spaced apart from each other so that a magnetic head may contact the magnetic tape running therebetween and which rotate in opposite direction to each other, a pair of pinch rollers which are engageable with and disengageable from said capstans, means for rotatably supporting each of said pinch rollers which are engageable with and disengageable from said capstans, means for rotatably supporting each of said pinch rollers, a pair of reel disks for driving reels which rotate in opposite direction to each other, a pair of idlers which are engageable with and disengageable from said reel disks so as to transmit rotational force from said rotational driving source to said reel disks, means for rotatably supporting each of said idlers, means for detecting the terminal end of the tape, a cam wheel rotated responsive to the detecting operation of said detecting means, a swing lever which is engaged at one end thereof with said cam wheel and swings as said cam wheel is rotated, said cam wheel operating to swing said swing lever from one swing position to another responsive to each operation of said detecting means, said swing lever being engaged with said means for supporting said pinch rollers and said means for supporting said idlers and casing, according to a swing position of said swing lever, either one of said pinch rollers corresponding to either one of said capstans to make pressing contact with said one capstan and causing either one of said idler to make pressing contact with either one of said reel disks disposed on the side corresponding to said one capstan, a plunger temporarily actuated by the detecting operation of said detecting means, a lock lever rotated by the operation of said plunger and having a projection provided at the foremost end thereof, and a rotation transmission wheel for transmitting rotation from said rotational driving source to said cam wheel in connection with rotation of said lock lever, said cam wheel having a recess in which said projection of the lock lever engages and said cam wheel receiving rotational force from said rotation transmission wheel and rotating when said projection of the lock lever is disengaged from said recess by the operation of said detecting means and stopping rotation by having said projection of the lock lever engaged in said recess when said cam wheel has caused said swing lever to swing from one swing position to another.

Other objects and features of the invention will become apparent from the description made hereinbelow with reference to the accompanying drawings, in which:

DETAILED DESCRIPTION OF THE INVENTION

Figures 1, 2:
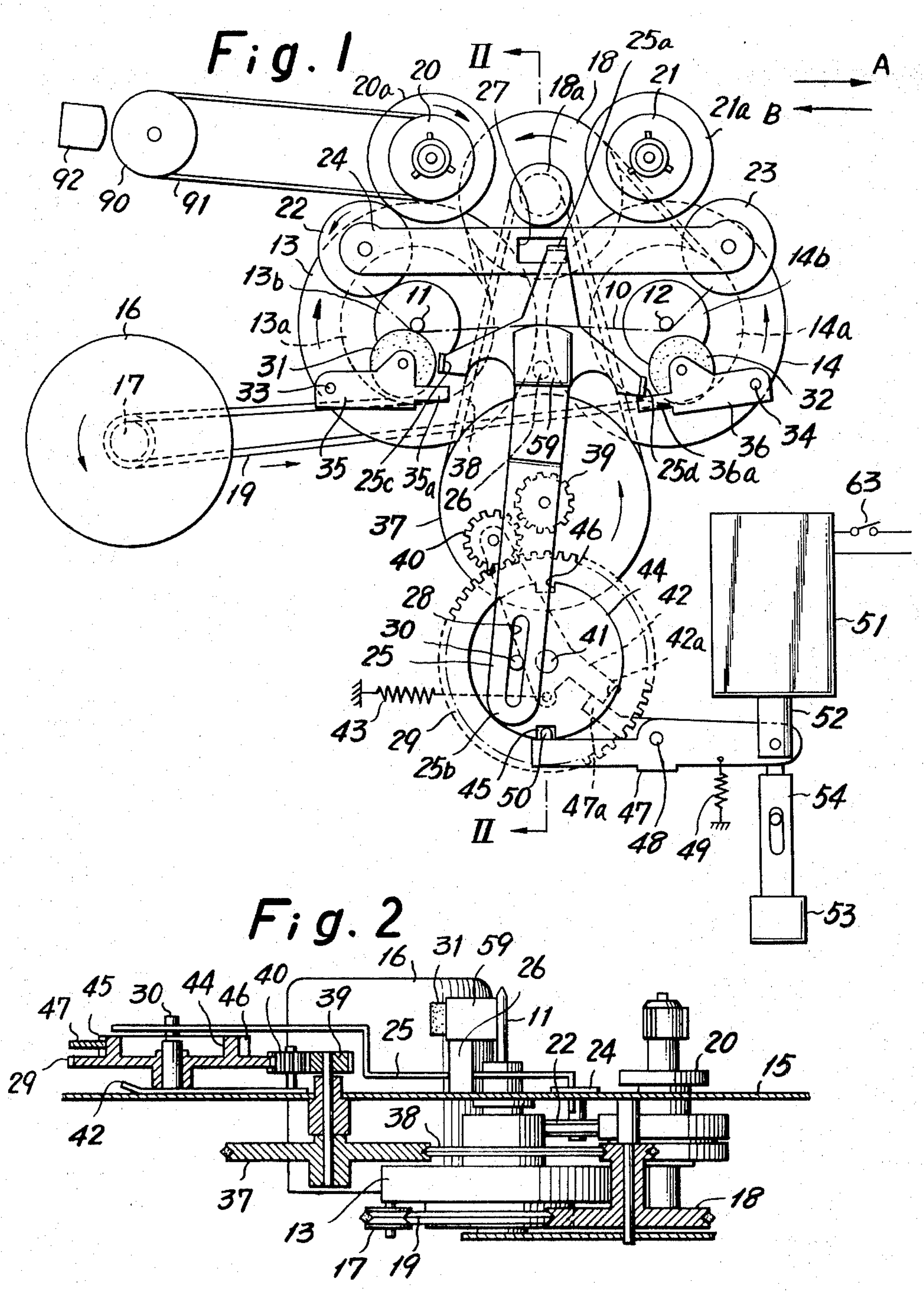
FIG. 1 is a plan view of an essential part of one embodiment of the automatic tape reversing apparatus according to the invention.
FIG. 2 is a vertically sectioned side view of the apparatus shown in FIG. 1 taken along the line II—II.

In FIGS. 1 and 2, capstans 11 and 12 which drive a magnetic tape 10 are respectively coaxially fixed to capstan wheels 13 and 14 and rotatably supported on a base plate 15. A belt 19 is stretched around a shaft 17 of a motor 16, pulley parts 13*a* and 14*a* of the capstan wheels 13 and 14 and an intermediate pulley 18 as shown in the figure. Accordingly, the capstans 11 and 12 rotate in opposite directions to each other. If the shaft 17 of the motor 16 is rotated in a counterclockwise direction, the capstan 11 is rotated in a clockwise direction and the capstan 12 is rotated in a counterclockwise direction.

Reel disks 20 and 21 are respectively rotated by pulley parts 13*b* and 14*b* of the capstan wheels 13 and 14 through idlers 22 and 23. The idlers 22 and 23 are respectively rotatably supported at both ends of an idler lever 24. The rightward or leftward movement of the idler lever 24 selectively brings either one of the idlers 22 and 23 into an abutting contact with the reel disk 20 or 21.

In the state shown in FIG. 1, the idler lever 24 has moved in the direction of arrow A. The idler 22 is in abutting engagement with the pulley part 13*b* of the capstan wheel 13 and the reel disk 20. In this state, the reel disk 20 rotates in the clockwise direction and takes up the tape. The reel disk 21 is not positively driven.

A lever 25 substantially of a cross shape is swingably supported about a shaft 26. A bent foremost end portion 25*a* of the lever 25 is engaged in an opening 27 formed in the middle of the idler lever 24. At a rear end portion 25*b* of the lever 25, there is formed a slot 28. A pin 30 provided on a cam gear 29 is engaged in the slot 28. Owing to the above described construction, rotation of the cam gear 29 causes the lever 25 to swing about the shaft 26.

Pinch rollers 31 and 32 which can make pressing contact with the capstans 11 and 12 are revolvably supported on holders 35 and 36 which are rotatably mounted on shafts 33 and 34. The holders 35 and 36 are constantly urged by springs 88 and 89 shown in FIG. 3 in directions to bring the pinch rollers 31 and 32 into pressing contact with the capstans 22 and 23. Bent end portions 25*c* and 25*d* of the left and right arms of the lever 25 are engageable with projections 35*a* and 36*a* of the holders 35 and 36. In the state shown in FIG. 1, the bent portion 25*d* of the lever 25 is in abutting engagement with the projection 36*a* of the holder 36, and the pinch roller 32 is spaced apart from the capstan 12. Whereas, the bent portion 25*c* is disengaged from the projection 35*a*, and the pinch roller 31 is in pressing contact with the capstan 11 through the tape 10.

A belt 38 is stretched around a pulley part 18*a* of the intermediate pulley 18 and a pulley 37. A gear 39 is coaxially provided on the pulley 37. An intermediate gear 40 is rotatably supported on the foremost end of an arm 42 which is loosely supported on a shaft 41 of the cam gear 29. The intermediate gear 40 is in mesh with the gear portion of the cam gear 29 and is also engageable with the gear 39 by rotation of the arm 42. A spring 43 stretched between the other end of the arm 42 and a chassis fixing part imparts a clockwise rotational force to the arm 42 thereby to maintain the meshing engagement between the intermediate gear 40 and the gear 39.

A cam portion 44 of the cam gear 29 is formed on its periphery with two recesses 45 and 46 which are provided at diametrically opposed positions relative to each other. A lock lever 47 is rotatably mounted on a shaft 48 and is pulled by a spring 49 in a clockwise direction. At the foremost end portion of the lock lever 47, there is provided a projection 50 which is engageable with the recesses 45 and 46 of the cam portion 44. A branch arm 47*a* of the lock lever 47 is engageable with rear end portion 42*a* of the arm 42. In the state shown in FIG. 1, the branch arm 47*a* which is under the influence of the force of the spring 49 is engaged with the rear end portion 42*a* against force of the spring 43, and locks the arm 42 in the position shown in the figure. The lock lever 47 is connected at its rear end to a rod 52 of a plunger 52. The other end of the lock lever 47 is also engageable with a push rod 54 attached to a push button 53.

A belt 91 is stretched around a rotary magnet 90 having a plurality of north poles and south poles arranged alternately and the reel disk 20. The rotary magnet 90 is rotated by rotation of the reel disk 20, and stops is rotation when the reel disk 20 stops rotation. A magnetic head 92 for detecting rotation is provided adjacent to the peripheral surface of the rotary magnet 90. While the rotary magnet 90 is rotating, an alternating magnetic flux is supplied to the head 92, whereby an electromotive force is generated in the coil of the head 92.

Figures 3, 4:
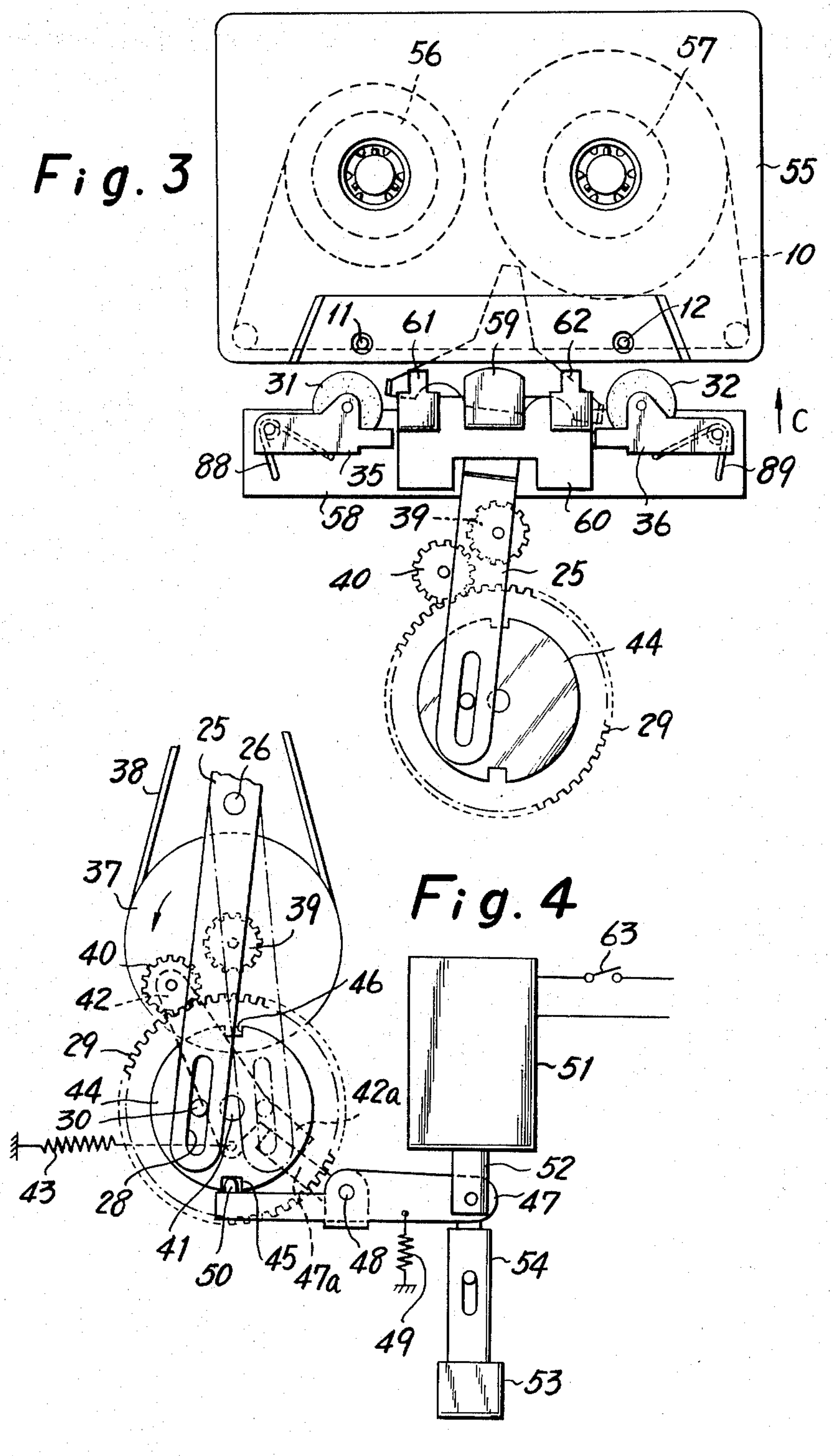
FIG. 3 is a plan view illustrating the state in which a cassette is loaded in the apparatus according to the invention.
FIG. 4 is a plan view illustrating the change over operation part of the apparatus in a state prior to the starting of the changing over operation.

As shown in FIG. 3, the holders 35 and 36 are supported by the shafts 33 and 34 on a sliding lever 58. A recording and reproducing magnetic head 59 and erasing magnetic heads 61 and 62 are provided on a head support 60 fixedly mounted on the sliding lever 58. The magnetic head 59 has two gaps which are disposed vertically relative to each other. An electrical connection to each gap is switched over according to the reversing of the running direction of the tape which will be described in detail later.

Nextly, the operation of the apparatus having the above described construction will be described.

A tape cassette 55 is loaded in a predetermined position in the tape recorder, as shown in FIG. 3. The tape cassette 55 contains the magnetic tape 10 and two spools 56 and 57 to which each end portion of the magnetic tape 10 is fixed. The tape 10 is wound on the two spools 56 and 57. When the tape cassette 55 is loaded, the capstans 11 and 12 enter the cassette case through apertures formed therein and take their positions inside the tape 10. The reel shafts of the reel disks 20 and 21 fit into the center holes of the spools 56 and 57 within the tape cassette 55. The apparatus is changed into a play mode automatically when the tape cassette 55 is loaded or by depressing a play button after the tape cassette 55 is loaded. The sliding lever 58 slides in the direction of arrow C and the heads 59, 61 and 62 enter the cassette case through the openings formed in the front of the cassette case and make contact with the magnetic tape 10. The pinch rollers 31 and 32 also move in the direction to enter the cassette case through the openings in the front and make contact with the capstans 11 and 12. Since the lever 25 is in a position in which it is slightly rotated clockwise from its central position as shown in FIG. 1, the projection 35*a* of the holder 35 does not engage the bent portion 25*c* of the arm of the lever 25. Accordingly, the pinch roller 31 enters the cassette case and makes pressing contact with the capstan 11 through the tape 10. In the meanwhile, the projection 36*a* of the holder 36 engages the bent portion 25*d* and is held in this position. The pinch roller 32 therefore remains spaced apart from the capstan 12.

Also, since the lever 25 is in a position in which it is rotated clockwise as described above, the idler lever 24 is in a position in which it is displaced in the direction of arrow A. The idler 22 is in contact with the pulley part 13*b* of the capstan wheel 13 and the disk 20*a* of the reel disk 20, whereas the idler 23 is spaced apart from the pulley part 14*b* and the disk 21a of the reel disk 21.

In this state, the motor 16 is started and the shaft 17 is rotated counterclockwise. The capstan wheel 13 rotates clockwise and the capstan wheel 14 rotates counterclockwise. Consequently, the tape 10 which is held between the capstan 11 rotating clockwise and the pinch roller 31 is driven and runs in the direction of arrow B, and is taken up on the spool 56 which is rotated by the reel disk 20 rotating in the clockwise direction. During the foregoing operation, the pulley 37 receives a rotational force through the pulley part 18*a* and the belt 38, and the gear 39 is rotated. However, the intermediate gear 40 is spaced apart from the gear 39, so that the cam gear 29 is not rotated but is at a standstill in the state shown in FIGS. 1 and 4.

As described in the foregoing, the tape 10 is driven and run by the capstan 11 and the pinch roller 31 in the direction of arrow B, whereby reproduction by the magnetic head 59 is effected. When the magnetic head 59 effects recording, the erasing head 62 is actuated to effect an erasing operation prior to the recording.

Figures 5, 6:
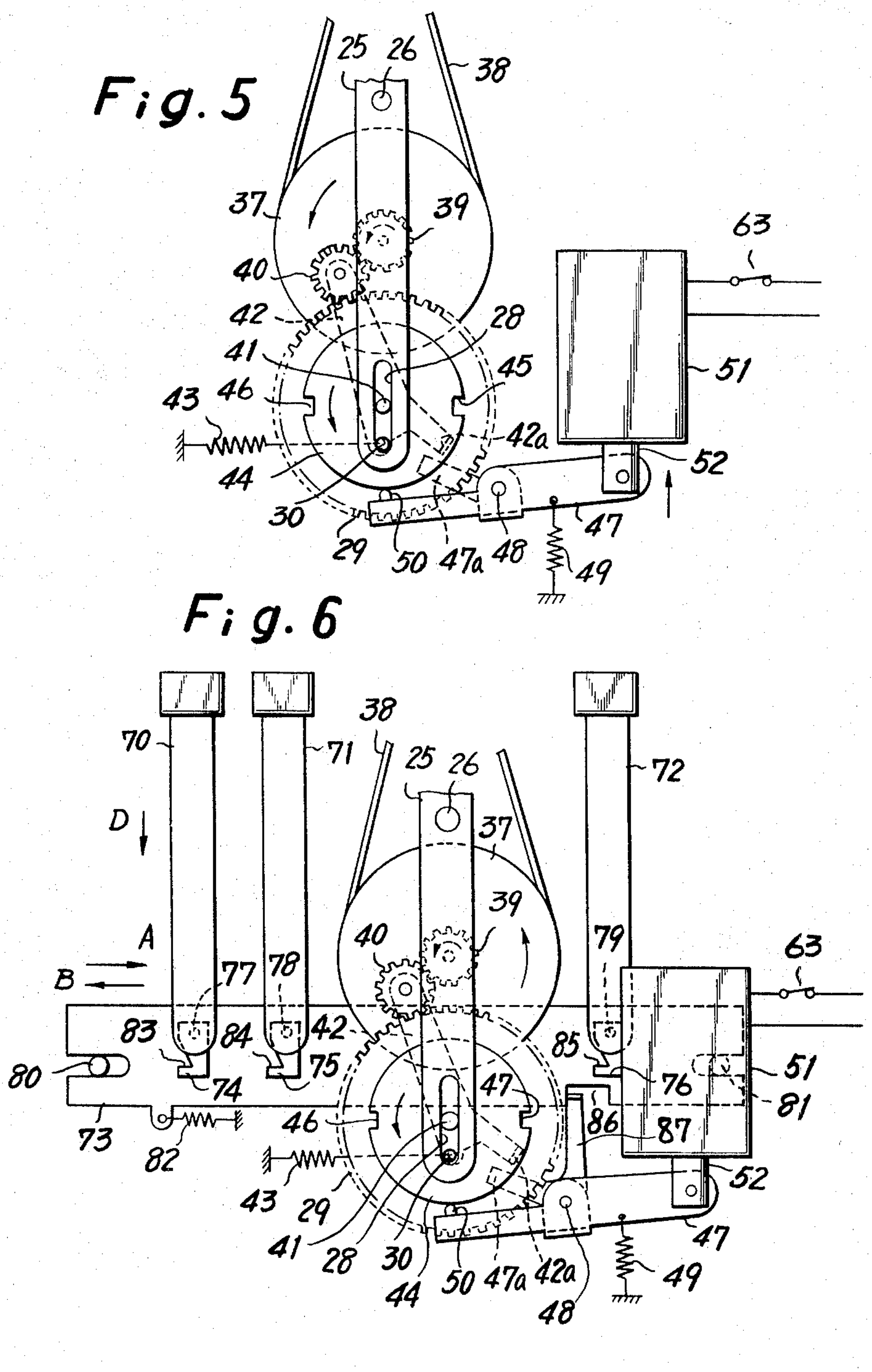
FIG. 5 is a plan view of the change over operation part during its change over operation.
FIG. 6 is a plan view of an embodiment in which the mechanism for changing over various operations is associated with the change over operation part.

When the whole tape 10 has been fed out of the spool 57 and taken up on the spool 56, the tape 10 stops its running and the spools 56 and 57 and the reel disks 20 and 21 stop their rotations because the terminal end thereof is fixed to the spool 57. When the reel disk 20 stops its rotation, a tape terminal end detection device consisting of the rotary magnet 90 and the head 92 detects the terminal end of the tape as described later, thereby substantially closing a switch 63 temporarily. The temporary closing of the switch 63 causes the plunger 51 to be actuated temporarily for pulling the rod 52 into the plunger 51. This causes the lock lever 47 to rotate in the counterclockwise direction with the projection 50 disengaged from the recess 45. The rotation of the lock lever 47 also causes the branch arm 47*a* to be spaced away from the rear end portion 42*a* of the arm 42. The arm 42 is rotated clockwise due to force of the spring 43, and the intermediate gear 40 rolls in meshing engagement with the gear portion provided on the outer periphery of the cam gear 29 and meshes with the gear 39, as shown in FIG. 5. At this time, the intermediate gear 40 is brought into mesh with the gear 39 while rotating on its own axis. Accordingly, the gear 39 is synchronously engageable with the gear 39. Further, since the intermediate gear 40 is disposed on the engaging side of the gear 39 and the cam gear 29, the secure engagement of the gears and an accurate transmission of rotational force are ensured.

The cam gear 29 starts to rotate in the counterclockwise direction, receiving rotational force from the pulley 37 through the gears 39 and 40. The pulley 37 is rotated due to rotational force from the motor 16 through the belt 19, the pulley 18 and the belt 38. As the cam gear 29 rotates, the pin 30 causes the lever 25 to swing in the counterclockwise direction about the shaft 26, thereby to reach the position shown by a chain line in FIG. 5 through the position shown in FIG. 4.

As described above, when the plunger 51 is temporarily actuated to disengage the projection 50 from the recess 45, the cam gear 29 simultaneously starts its rotation. Accordingly, even after the plunger 51 ceases operation, the projection 50 is in abutting contact with the peripheral surface of the cam 44, and the lock lever 47 is held in the position in which it is rotated in the counterclockwise direction against the force of the spring 49. Consequently, the gear 40 remains in meshing engagement with the gear 39 and the gear portion of the cam gear 29. Since, however, the lock lever 47 is under the influence of a clockwise rotational force due to the spring 49, the projection 50 of the lock lever 47 engages the recess 46 of the cam 44 and locks the cam 44 when the cam 44 has rotated with the cam gear 29 by 180° in the counterclockwise direction starting from the position shown in FIG. 4. Simultaneously, the lock lever 47 is rotated clockwise, and the branch arm 47a pushes the rear end portion 42a of the arm 42 thereby causing the arm 42 to rotate counterclockwise. Consequently, the intermediate gear 40 is spaced away from the gear 39 and the cam gear 29 stops its rotation. At this time, the lever 25 stops at a position shown by a chain line in FIG. 4.

By the counterclockwise swing of the lever 25 as described above, the foremost bent end portion 25a engaged in the opening 27 causes the idler lever 24 to move in the direction of arrow B. The movement in the direction of arrow B of the idler lever 24 causes the idler 22 to move away from the pulley part 13*b* and the reel disk 20*a*. Accordingly, the reel disk 20 stops its rotation. On the other hand, the idler 23 is brought into abutting engagement with the pulley part 14*b* and the reel disk 21*a*, whereby the reel disk 21 is rotated counterclockwise. Again, by the counterclockwise swing of the lever 25, the bent end portion 25*c* pushes the projection 35*a* of the pinch roller holder 35. Accordingly, the pinch roller holder 35 is rotated clockwise, causing the pinch roller 31 to move away from the capstan 11 and the tape 10. On the other hand, the bent end portion 25*d* of the lever 25 is spaced away from the projection 36*a* of the holder 36, and the pinch roller holder 36 is rotated clockwise, causing the pinch roller 32 to make pressing contact with the capstan 12 through the tape 10.

The tape 10 which was running from the spool 57 to the spool 56 in the direction of arrow B is now driven and runs in the direction of arrow A, being held between the capstan 12 rotating counterclockwise and the pinch roller 32. The tape 10 which has run is taken up on the spool 57 driven and rotated counterclockwise by the reel disk 21. Accordingly, when the magnetic tape 10 has finished its running in one direction, the running direction is automatically reversed. Simultaneously, the head tip of the magnetic head 59 is changed in its electrical connection due to the swing of the lever 25, and the magnetic head 59 effects, during the running of the tape 10 in the direction of arrow A, recording or reproduction on a track which is different from that used during the running of the tape 10 in the direction of arrow B.

When the tape 10 driven and running in the direction of arrow A has run to its terminal end, the tape terminal detection device operates again. The plunger 51 is actuated temporarily, the cam gear 29 is rotated by 180°, each member is restored to the state shown in FIG. 1, and the tape 10 resumes its running in the direction of arrow B. A repetitious reproduction in the forward and reverse running directions of the tape 10 is made by repetition of the above described operation.

Even during the running of the tape 10 before it is fed to the terminal end, the running direction of the tape can be reversed by pushing the push button 53 temporarily to rotate the lock lever 47 by means of the rod 54 or by closing the switch 63 temporarily to rotate the lock lever 47, which causes the cam gear 29 to be rotated by 180° as in the case wherein the tape has come to its end.

FIG. 6 shows an embodiment in which a mechanism for changing over various modes is associated with the change over operation part. This change over mechanism performs an operation for changing over various operation modes other than reproduction, such as fast forwarding, rewinding, recording etc., to a reproduction mode when the running direction of the tape is reversed. Levers 70, 71 and 72 which are provided at one end thereof with push buttons for fast forwarding, rewinding and recording respectively are provided on the lower surface of the foremost end portion thereof with pins 77, 78 and 79 which respectively engage openings 74, 75 and 76 formed in a lock plate 73. The lock plate 73 is capable of sliding in the directions of arrows A and B, guided by pins 80 and 81 which are engaged in the U-shaped recesses formed at both ends of the lock plate 73. The lock plate 73 is under the influence of sliding force acting in the direction of arrow A due to a spring 82. When either one of the levers 70, 71 and 72 is pushed in the direction of arrow D, either one of the pins 77, 78 and 79 which corresponds to the pushed lever advances while pushing one of the pawls of pawl portions 83, 84 and 85 provided in the openings 74, 75 and 76. This causes the lock plate 73 to slide for a brief time in the direction of arrow B. When the pin engages a slot portion of the opening, the lock plate 73 slides back in the direction of arrow A by force of the spring 82 and is locked in the position. The lock plate 73 is formed at one side edge thereof with a recess 86. The foremost end portion of a second branch arm 87 of the lock lever 47 is engaged in this recess 86.

When the lock lever 47 is rotated counterclockwise as previously described with reference to FIGS. 4 and 5, the lock plate 73 is pushed in the direction of arrow B by a second branch arm 87 of the lock lever 47. As a result, one of the levers 70, 71 and 72 which was locked by one of the pawls 83, 84 and 85 is released from its locked position and returns to the initial position. Accordingly, if either one of the levers 70, 71 and 72 is pushed by means of the push button and the tape runs in one of the fast forwarding, rewinding and recording, the running direction of the tape is reversed in the same manner as described above when the tape has run to its terminal end. Simultaneously, the operation mode is automatically changed into a reproduction mode because the one of the levers 70, 71 and 72 returns to its initial position.

Even during the operation of the mode which corresponds to one of the levers 70, 71 and 72 which is pushed, the mode is automatically changed into a reproduction mode by pushing the push button 53 or by closing the switch 63 temporarily.

If the operation mode remains in a recording mode after the tape has run to its terminal end and the running direction of the tape is reversed, recorded information on the tape is likely to be erased erroneously. According to the apparatus incorporating this embodiment, the above described accident will be prevented because the operation mode, in whichever mode it may have been, is changed into a reproduction mode when the tape has run to its terminal end. Further, in case the fast forwarding or rewinding mode is finished, it is a usual practice to release the apparatus from the fast forwarding or rewinding mode and change it into the reproduction mode. In the apparatus incorporating this embodiment, a troublesome operation of changing over to the reproduction mode when the tape has run to its terminal end is unnecessary. Furthermore, the listener can know that a mode other than the reproduction mode has been finished by sounding of the reproduced sound. Therefore, the listener may change the apparatus into the recording mode or replacce the cassette if he does not want to continue the reproduction mode.

Figure 7:
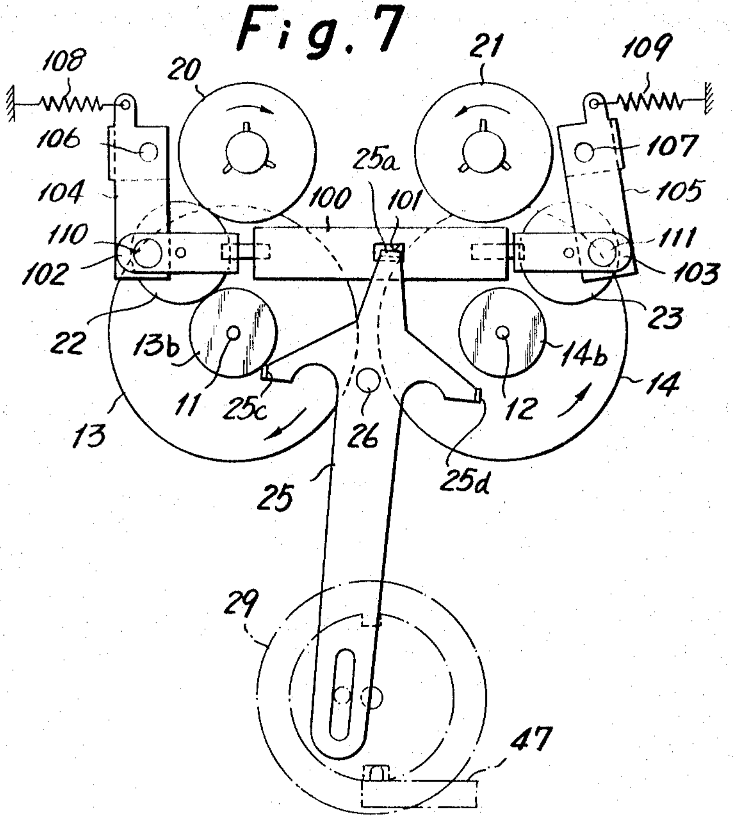
FIG. 7 is a plan view of another embodiment of an idler engaging and disengaging mechanism.

FIG. 7 shows another embodiment of the idler engaging and disengaging mechanism. The bent end portion 25a at the head of the swing lever 25 is engaged in an opening 101 formed in the middle portion of an operation lever 100. Levers 102 and 103 carrying idlers 22 and 23 rotatably supported thereon are attached to either end of the operation lever 100. Swingable levers 104 and 105 are rotatably supported on shafts 106 and 107 and are respectively under the influence of forces of springs 108 and 109 acting respectively in the counterclockwise and clockwise directions. The levers 102 and 103 are rotatably supported on the foremost end portions of the levers 104 and 105 about shafts 110 and 111. This enbodiment is identical with the previously described embodiment in that the operation lever 100 moves leftwardly or rightwardly due to the swing of the swing lever 25, thereby causing the idler 22 or 23 to make pressing contact with the pulley part 13b or 14b.

Figure 8:
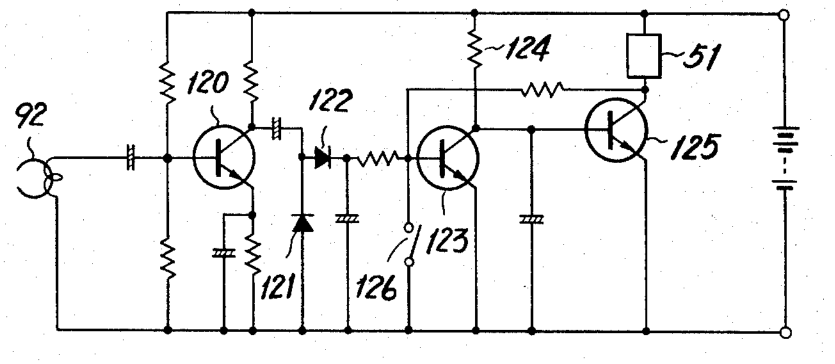
FIG. 8 is an electrical circuit diagram of one embodiment of the tape terminal end detection device.

FIG. 8 shows an electrical circuit diagram of one embodiment of the tape terminal end detecting device. While the reel disk 20 is rotating and the rotary magnet 90 is also rotating as described above, an alternating magnetic flux is supplied to the magnetic head 92 from the peripheral surface of the magnet 90, so that an electromotive force is generated in the coil of the head 92. The output from the head 92 is amplified by a transistor 120, and the collector output of the transistor 120 is rectified by diodes 121 and 122. This rectified voltage is applied to the base of transistor 123 as a base bias. The collector of the transistor 123 is connected to the base of a transistor 125 and also to a resistor 124. When the transistor 123 is in a conductive state, the base of the transistor 125 is nearly at earth potential, and the transistor 125 is in a non-conductive state. Accordingly, the solenoid of the plunger 51 which is connected to the collector of the transistor 125 is not actuated during this time.

When the tape has run to its terminal end and stopped, the rotation of the reel disk 20 and the rotary magnet 90 stops. At this time, the output from the magnetic head 92 is reduced to zero. Consequently, the bias applied to the base of the transistor 123 is reduced to zero, and the transistor 123 becomes non-conductive. This causes the base potential of the transistor 125 to rise and places the transistor 125 in a conductive state. The conduction of the transistor 125 is substantially equivalent to closing of the switch 63, so that the plunger 51 is actuated.

For actuating the plunger 51 during the running of the tape, a manual switch 126 is closed. By closing of the switch 126, the base potential of the transistor 123 becomes earth potential, and the transistor 123 becomes non-conductive. Consequently, the transistor 125 becomes conductive and the plunger 51 is actuated.

The tape terminal detection device to be used in the apparatus according to the invention is not limited to the above described embodiment. For this purpose, a conventional device such as one in which the tape terminal end is detected by variation of tape tension or one which consists of a sensing tape attached to the terminal end of the tape and a sensor which is electrically closed when it contacts the sensing tape may be used.

This invention is not limited to these embodiments but various variations and modifications may be made without departing from the scope and spirit of the invention.

I claim:

1. An automatic tape running reversing apparatus for use in a tape recorder comprising a rotational driving source, a pair of capstans for driving a magnetic tape which are provided spaced apart from each other so that a magnetic head may contact the magnetic tape running therebetween and which rotate in opposite directions to each other, a pair of pinch rollers, the pinch rollers being engageable with and disengageable from said capstans, means rotatably supporting each of said pinch rollers, a pair of reel disks for driving reels which rotate in opposite directions to each other, a pair of idlers engageable with and disengageable from the reel disks so as to transmit rotational force from the rotational driving source to the reel disks, means rotatably supporting each of the idlers, means detecting the terminal end of the tape, a cam wheel rotated responsive to the detecting operation of the detecting means, a swing lever engaged at one end thereof with the cam wheel and swingable as the cam wheel is rotated, the cam wheel operating to swing the swing lever from one swing position to another responsive to each operation of the detecting means, the swing lever being engaged with the means supporting the pinch rollers and the means supporting the idlers and causing, according to a swing position of the swing lever, either one of the pinch rollers corresponding to either one of the capstans to make pressing contact with the one capstan and causing either one of the idlers to make pressing contact with either one of the reel disks disposed on the side corresponding to the one capstan, a plunger temporarily actuated by the detecting operation of said detecting means, a lock lever rotated by the operation of said plunger and having a projection provided at the foremost end thereof, and a rotation transmission wheel for transmitting rotation from said rotational driving source to said cam wheel in connection with rotation of said lock lever, said cam wheel having a recess in which said projection of the lock lever engages and said cam wheel receiving rotational force from said rotation transmission wheel and rotating when said projection of the lock lever is disengaged from said recess by the operation of said detecting means and stopping rotation by having said projection of the lock lever engaged in said recess when said cam wheel has caused said swing lever to swing from one swing position to another.

2. The automatic tape running reversing apparatus as defined in claim 1 which further comprises a rotatably supported arm revolvably supporting said rotation transmission wheel, said lock lever having a branch arm portion which engages one end portion of said arm, said branch arm portion placing said rotation transmission wheel with the one end of said arm pushed by said branch arm portion in a position in which the rotational force from said rotational driving source is not transmitted to said cam wheel while said projection of the lock lever is engaged in said recess of the cam wheel and placing said rotation transmission wheel in a position in which the rotational force from said rotational driving source is transmitted to said cam wheel which said projection of the lock lever is out of engagement with said recess.

3. The automatic tape running reversing apparatus as defined in claim 1 which further comprises means for rotating said lock lever by a manual operation in a direction in which said projection is disengaged from said recess.

4. The automatic tape running reversing apparatus as defined in claim 1 which further comprises mode maintenance means for maintaining state of mode other than reproduction mode and means for releasing the state of maintenance of said mode maintenance means by rotation of said lock lever.

* * * * *